Patented Apr. 6, 1954

2,674,615

UNITED STATES PATENT OFFICE 2,674,615

1-ARYLCYCLOALKANE 1-THIOCARBOXYLATES

Arthur W. Weston, Waukegan, Ill., assignor to Abbott Laboratories, North Chicago, Ill., a corporation of Illinois No Drawing. Application June 28, 1952,
Serial No. 296,237

6 Claims. (Cl. 260—455)

This invention relates generally to novel physiologically active substances and more specifically to derivatives of arylcycloalkane carboxylic acids which are useful therapeutically as antispasmodics. (Substances which have a relaxing effect on smooth muscle.)

This application is a continuation-in-part of my copending application S. N. 600,241 filed June 18, 1945, now abandoned.

The novel compounds to which this invention pertains are selected from members of the group consisting of an ester of the formula

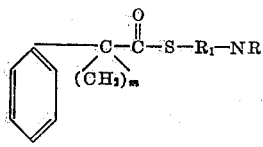

the acid addition salts thereof and the quaternary ammonium salts thereof, wherein $m$ is an integer from 2 to 5 inclusive, $R_1$ is a lower alkylene group and NR is a di (lower alkyl) amino group.

The "di (lower alkyl) amino group" referred to herein includes all compounds in which the lower alkyl radical is the methyl, ethyl, propyl, isopropyl, butyl, isobutyl, amyl or isoamyl radical.

The term "lower alkylene group" as used herein to define the symbol $R_2$ is intended to include the $CH_2$, $C_2H_4$, $C_3H_6$, $C_4H_8$, $C_5H_{10}$, $C_6H_{12}$ and similar radicals and the branched chain equivalents thereof.

These compounds have been found to have valuable therapeutic properties, especially as antispasmodic agents. They may be administered orally or parenterally. For oral use, they may be prepared in liquid form, or in solid form as powder or tablets, either alone or in admixture with other substances. Usually these substances are more soluble in water when in the form of acid addition salts rather than as the free bases. Any acid which produces a water-soluble salt and does not appreciably enhance the toxicity is suitable for use in forming the salts. Such acids as sulphuric, phosphoric, hydrochloric, levulinic, mucic, acetic and tartaric acid are among those which are satisfactory. The salts produced by combination of these bases with certain other non-toxic acids such as tannic acid are very sparingly soluble in water. These sparingly soluble compounds, as well as the free bases, may be administered when the pharmacological effect desired should be slow in onset and relatively long in duration. Where any ester or amide is mentioned in the following product claims, it is intended to include both the free base and the salts. It will be obvious that such addition compounds as the quaternary ammonium salts, of which the methiodide of Example I is an illustration, may be derived from any of the other examples of esters or amides and by use of other organic halides or sulfates.

The compounds included in this invention may be prepared according to the specific instructions given in the hereinafter presented examples and by numerous other methods. For instance 1-arylcycloalkane-1-thiocarboxylic acid is neutralized with an alcoholic solution of an alkali metal hydroxide (such as the hydroxide of sodium or potassium). The mixture is concentrated to dryness and then heated with the appropriate aminoalkyl halide. The resulting mixture is washed with water, concentrated, dried, and distilled (under reduced pressure, if necessary). Or if there is used an organic halide containing two halogen atoms per molecule and only one has reacted with the alkali metal salt then the monohalogen compound is allowed to react with the appropriate substance (such as an alkyl amine) to replace the remaining halogen atom by the desired group. The reaction may be carried out by heating for several hours in an organic solvent such as benzene. The mixture is then washed with water, dried, concentrated and purified by distillation (under reduced pressure, if necessary).

The esters may be produced as follows: The 1-aryl-1-cycloalkane carboxylic acid halide is heated with the desired halogen substituted mercaptan to produce a halo-alkyl ester. This ester is then heated with the desired amine with or without the addition of solvent. The resulting amino ester of the 1-aryl-cycloalkane-1-carboxylic acid may be purified as above.

Compounds such as those produced by the above general methods are converted to acid addition salts by dissolving them in an organic solvent such as ether and adding the desired acidic material such as a dry hydrogen chloride gas or concentrated sulphuric acid. The salt precipitates and is then filtered off and dried. It is further purified by recrystallization from organic solvents.

Quaternary ammonium salts are produced by treating the bases such as those formed in methods outlined above with the appropriate organic halide or sulfate. This is done by mixing the two reactants with or without the use of a diluent such as an organic solvent. The crude product is recrystallized from organic solvents.

The invention is disclosed in further detail by

Example I

β-diethylaminoethyl 1-phenylcyclopropane-1-thiocarboxylate

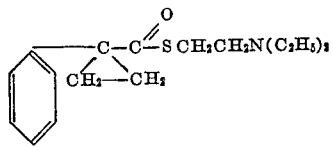

To a benzene solution of 8.2 parts of β-diethylaminoethylmercaptan there is added slowly 5.4 parts of 1-phenylcyclopropane-1-carboxylic acid chloride. There is an immediate reaction. The reaction mixture is allowed to stand several hours and the β-diethylaminoethylmercaptan hydrochloride is then removed by filtration. The benzene filtrate is washed with water, dried and distilled. There is thus obtained β-diethylaminoethyl 1 - phenylcyclopropane - 1 - thiocarboxylate which has a boiling point of 164–165° C. at 2 mm.

Example II

The hydrochloride salt of the base described in Example I can be prepared by treating the base with hydrogen chloride in a suitable solvent. After crystallization from ethyl acetate the hydrochloride salt melts at 137.5–138.5° C.

Example III

The methiodide of the base mentioned in Example I is prepared by allowing the base to react with methyl iodide at room temperature. The quaternary ammonium salt of the base is obtained and is crystallized from an alcohol-ether mixture.

Example IV

γ-dimethylaminopropyl 1-phenylcyclohexane 1-thiocarboxylate is prepared as follows: To a benzene solution of 1 mol of γ-dimethylaminopropyl mercaptan is added slowly 1 mol of 1-phenylcyclohexane 1-carboxylic acid chloride. There is an immediate reaction. The reaction mixture is allowed to stand several hours and the γ-dimethylaminopropylmercaptan hydrochloride is then removed by filtration. The benzene filtrate is washed with water, dried and distilled. There is obtained γ-dimethylaminopropyl 1-phenylcyclohexane 1-thiocarboxylate.

The hydrochloride salt is prepared by treating the base with hydrogen chloride in a suitable solvent and crystallized from ethyl acetate.

The quaternary ammonium salt is prepared by allowing the base to react with methyl iodide at room temperature. The salt is crystallized from an alcohol-ether mixture.

Others may readily adapt the invention for use under various conditions of service, by employing one or more of the novel features disclosed or equivalents thereof. As at present advised with respect to the apparent scope of my invention, I desire to claim the following subject matter.

I claim:

1. A member of the group consisting of an ester of the formula

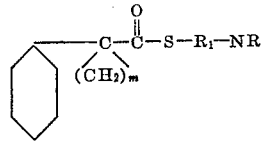

the acid addition salts thereof and the quaternary salts thereof, wherein $m$ is an integer from 2 to 5 inclusive, $R_1$ is a lower alkylene group and NR is a di (lower alkyl) amino group.

2. β-diethylaminoethyl 1-phenylcyclopropane 1-thiocarboxylate.

3. γ-dimethylaminopropyl 1-phenylcyclohexane 1-thiocarboxylate.

4. The quaternary ammonium salt of the compound of claim 2.

5. The quaternary ammonium salt of the compound of claim 3.

6. The acid addition salt of the compound of claim 2.

References Cited in the file of this patent

UNITED STATES PATENTS

| Number | Name | Date |
|---|---|---|
| 2,589,937 | Hafliger et al. | Mar. 18, 1952 |